May 1, 1951  H. B. DRAPEAU  2,550,917
PILOT CONTROLLED DIAPHRAGM TYPE FLUID CONTROL DEVICE
Filed May 18, 1944  2 Sheets-Sheet 1
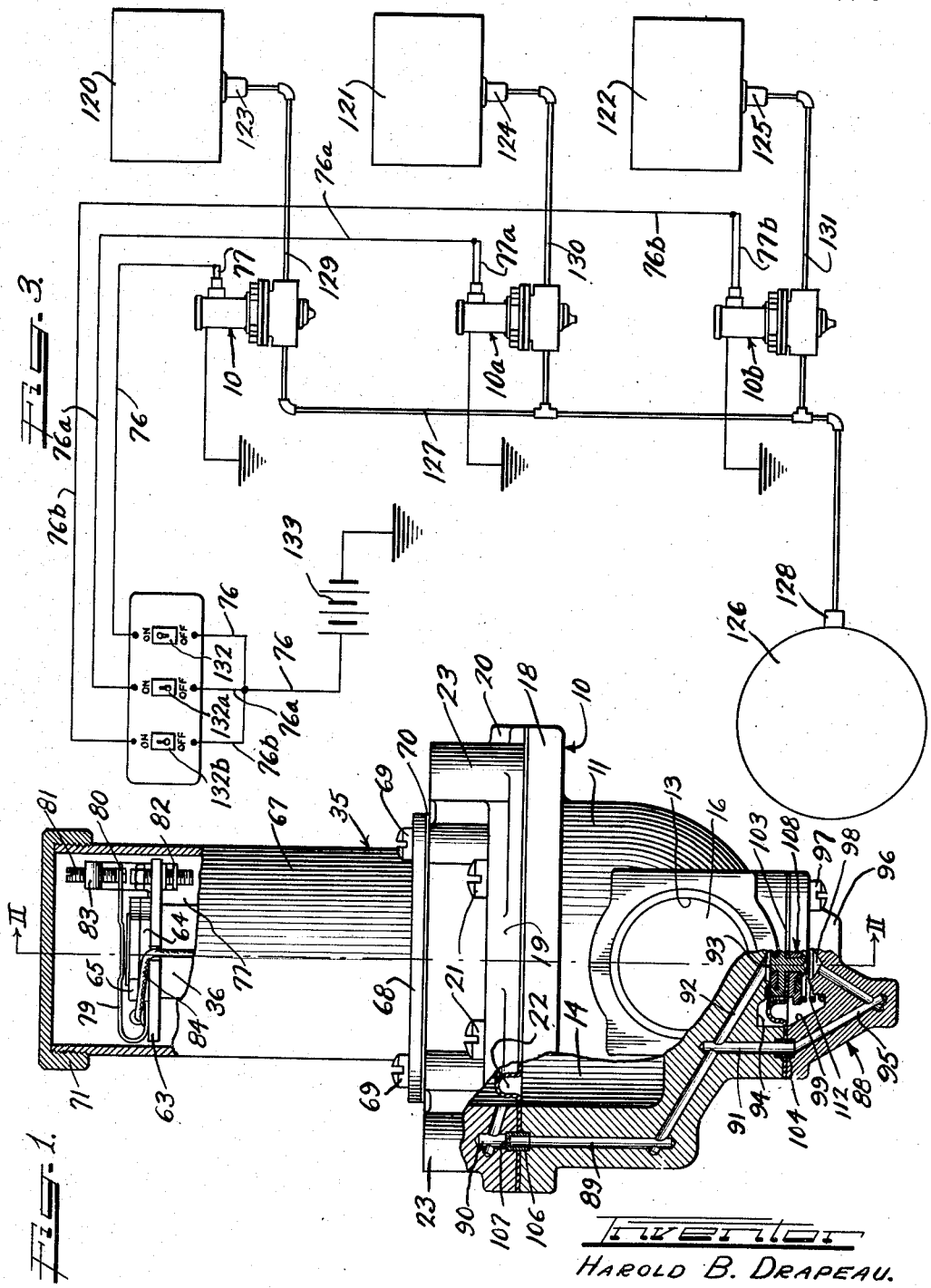
Inventor
HAROLD B. DRAPEAU.
by Charles W. Hills Attys.

May 1, 1951     H. B. DRAPEAU     2,550,917
PILOT CONTROLLED DIAPHRAGM TYPE FLUID CONTROL DEVICE
Filed May 18, 1944     2 Sheets-Sheet 2
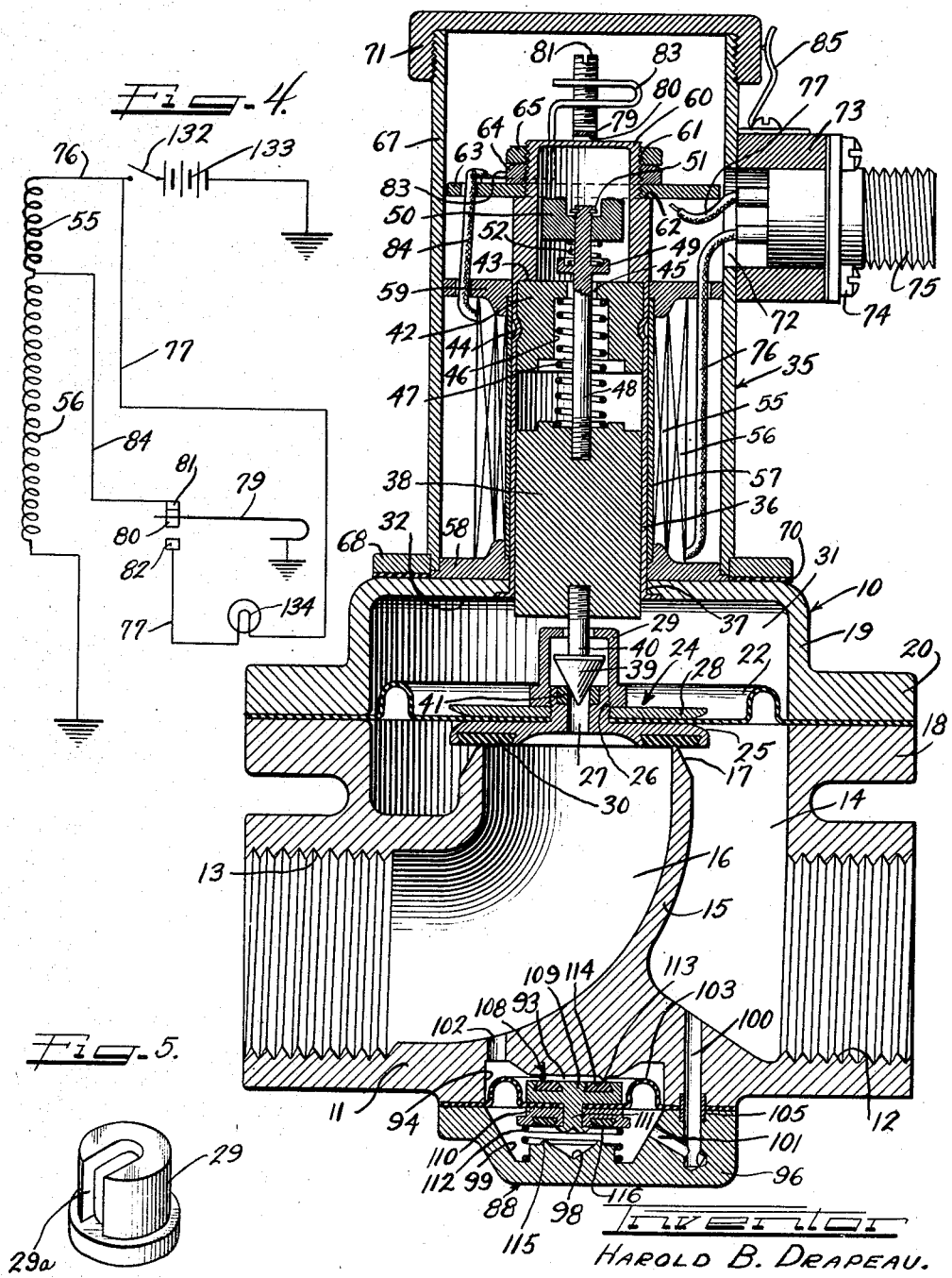
Inventor
HAROLD B. DRAPEAU.
by Charles W. Hills Atty.

Patented May 1, 1951

2,550,917

UNITED STATES PATENT OFFICE 2,550,917

PILOT CONTROLLED DIAPHRAGM TYPE FLUID CONTROL DEVICE

Harold B. Drapeau, Oak Park, Ill., assignor to The Dole Valve Company, Chicago, Ill., a corporation of Illinois Application May 18, 1944, Serial No. 536,123

14 Claims. (Cl. 158—36)

The present invention relates to an improved form of fluid control device, and more particularly to a fluid control device of the pilot controlled, fluid operated diaphragm type.

Conventional diaphragm type valves only operate satisfactorily when the high pressure side remains the same, or in other words when the fluid pressure on the side of the valve which is normally the inlet side exceeds that on the side of the unit which is normally the outlet side. In such conventional valves if the pressure drop is reversed in direction, the diaphragm will open irrespective of the position of the pilot.

The valve unit of the present invention represents a distinct improvement over such conventional units in that it embodies means for preventing the undesired opening of the diaphragm by any reversal in direction of the pressure drop through the valve. The novel valve structure of the invention provides a structure in which the diaphragm is at all times under the full control of the pilot provided that the pressure drop is in the desired direction. It also provides means for assuring a fully open valve when the pilot is operated to open the valve. Moreover, the unit operates to minimize the occurrence of pressure drops in the fluid system by any partial opening of the diaphragm.

The fluid control device of the present invention is particularly useful in a fluid system of the type employed for supplying fuel from a plurality of storage tanks to an airplane engine. The device of the invention operates efficiently in such installations and serves to eliminate undesired cross flow between tanks and also tends to eliminate mechanical vaporization of the fuel through the valve such as might result in a vapor lock. A suitable signalling system may be employed in cooperation with the valve of the present invention to indicate when the valve is opened to the flow of fluid.

It is an object of the present invention to provide a novel fluid control unit.

Another object of the present invention is to provide a novel pilot operated diaphragm valve having the above indicated desirable characteristics.

It is a further object of the present invention to provide a fluid control unit embodying a flexible diaphragm for controlling the flow of fluid therethrough which is economical to manufacture and which is rugged and reliable in use.

Another object of the present invention is to provide a novel fluid control device which is adapted to use in a fluid control system for handling fluid under pressure.

Another and further object of the present invention is to provide a fluid control unit including a diaphragm adapted to be actuated by a pressure differential created on opposite sides of the diaphragm by the fluid itself and brought about by the automatic actuation of a pilot valve.

Another and still further object of the present invention is to provide a pilot operated diaphragm valve in which the fluid acting on the diaphragm to close the valve is always obtained from the fluid on the higher pressure side of the valve irrespective of which side of the valve the fluid of higher pressure is on.

The novel features which are believed to be characteristic of my invention are set forth with particularity in the appended claims. My invention itself, however, both as to its organization, method of operation and manner of construction, together with further objects and advantages thereof, may best be understood by reference to the accompanying drawings, in which:

Figure 1 is an elevation with parts in section and broken away illustrating one form of fluid control unit embodying the novel features of the present invention;

Figure 2 is a vertical cross-section taken substantially along the line II—II in Figure 1;

Figure 3 is a diagrammatic representation of a typical fluid control system embodying a plurality of the fluid control units of the present invention;

Figure 4 is a diagrammatic representation of a typical wiring diagram which illustrates the manner of operation of the fluid control unit of the invention; and Figure 5 represents an isometric view of one of the elements of the fluid control unit of the invention.

Referring now to the illustrated embodiment of the invention, there is shown in Figures 1 and 2 a fluid control unit 10 comprising a main housing member in the form of a casting 11 having a pair of oppositely disposed bosses defining an inlet duct 12 and an outlet duct 13 each of which is internally threaded for connection to a suitable fluid supply conduit. The casting 11 is provided with an internal well 14 into which a substantially centrally disposed elbow portion 15 of the casting 11 projects. The elbow portion 15 is adapted to define an outlet passage 16 communicating with the outlet duct 13. The end of the elbow portion 15 opposite that at which the outlet duct 13 is disposed is provided with a tapered seat portion 17 disposed adjacent the open end of the well 14 in the casting 11.

The casting 11 is provided with an outturned flange portion 18 to which is secured a cover member 19 having a correspondingly shaped flanged portion 20. The cover member 19 is demountably attached to the casting 11 as by means of a plurality of machine screws 21 and secures therebetween the marginal portion of a flexible diaphragm 22. The cover member 19 may, if desired, be provided with a plurality of mounting bosses 23 disposed at spaced intervals about the flanged portion 20 thereof to enable the device to be mounted in or on a suitable panel board, partition or the like.

The flexible diaphragm 22 may advantageously be fabricated from synthetic rubber reinforced with nylon fabric and resistant to aromatic fuel. The material Sirvene or, in fact, any other suitable material which possesses flexibility as well as the ability to withstand the deleterious effect of the fluid being handled may be employed in the fabrication of the diaphragm 22. The diaphragm 22 is centrally apertured to receive the valve assembly 24 which cooperates with the seat 17 at the uppermost end of the outlet passage 16 to control the flow of fluid from the well 14 into said outlet passage 16.

The valve assembly 24 includes an annular member 25 having a centrally disposed stem portion 26 formed integrally therewith which is adapted to project through the aperture in the flexible diaphragm 22. The stem portion 26 is externally threaded and has a passage 27 extending axially thereof for interconnecting a chamber 31 formed within the recess 32 in the cover member 19 above the diaphragm 22 with the outlet passage 16. A disk 28 is adapted to be threaded upon the external periphery of the stem portion 26 for securing the flexible diaphragm 22 between said disk and the annular member 25. A cap 29 (see Figure 5) may also be screwed upon the threaded external periphery of the stem portion 26 of the annular member 25 to lock the disk 28 in place.

A suitable non-metallic insert or ring 30 may be provided in the under side of the annular member 25 for contact with the seat portion 17 on the elbow portion 15 of the casting 11. The ring 30 may be made of neoprene, rubber, artificial rubber or any other suitable non-metallic plastic material which will be resistant to the action of the fluid for the control of which the fluid control unit 10 is employed and serves to form a fluid tight seal for the outlet passage 16 to prevent the passage of fluid therethrough. Moreover, the ring 30 operates to prevent a metal-to-metal contact within the body of the fluid occupying interior of the fluid control unit 10, a feature which is of utmost importance where highly volatile and inflammable fluids are being handled.

The flexible diaphragm 22 is adapted, as previously indicated, to be actuated by the production of a pressure differential between that portion of the fluid confined in the chamber 31 and that portion of the fluid introduced to the internal well 14 in the casting 11 through the inlet duct 12. This may be accomplished in any satisfactory manner but is preferably achieved by the employment of the pilot valve structure 35 which will now be described in detail.

The pilot valve structure 35, which is advantageously of the solenoid operated type, embodies a generally tubular member 36 inserted in an aperture 37 in the cover member 19 and secured thereto in any suitable fashion as, for example, by welding, brazing or the like. The member 36 is preferably open at the end thereof secured to the cover member 19 to provide internal communication with the chamber 31 formed in the recess 32 thereof. The member 36 is preferably formed of some suitable non-magnetic material to provide a suitable guideway or slidable mounting for the reciprocable core 38 which is preferably formed of soft iron or some other highly magnetic material.

The core 38 carries on the lowermost end thereof a conically shaped pilot valve 39 the shank portion 40 of which is threaded into said core and so disposed that the vertex of said valve 39 will contact the inner periphery of a washer 41 inserted in the end of the stem portion 26 of the annular member 25 so as to register with the passageway 27. The conically shaped end portion of the pilot valve 39 is housed in the cap 29 being inserted therein by registration of the shank portion 40 with a radially extending slot 29a provided in the peripheral wall of the cap. The removal of the pilot valve 39 from contact with the washer 41 upon the actuation of the core 38 will cause the passageway 27 to be opened thus permitting fluid confined in the chamber 31 to pass through the slot 29a in the cap 29 (Figure 5) through said passageway 27 into the outlet passage 16 to create a pressure differential on opposite faces of the flexible diaphragm 22.

In addition to the pressure differential created by the opening of the passage 27, the base of the conically shaped end portion of the pilot valve 39 contacts the end wall of the cap 29 through which the shank portion 40 extends. When the pilot valve 39 is raised from contact with the washer 41, the entire valve assembly 24 will be lifted off the seat 17. Thus the actuation of the pilot valve 39 assists the pressure differential created by the opening of passage 27 and insures a positive and full opening of the valve assembly 24 with respect to seat 17. This feature is not found in the conventional diaphragm valve unit in which the pressure differential alone is utilized and the diaphragm opens only in proportion to the extent that the pressure in the inlet exceeds that in the outlet.

A plug 42 is disposed internally of the tubular member 36 against a shoulder 43 formed internally thereof and held in place as by means of a crimp 44 of annular form which engages a similarly shaped groove cut in the outer periphery of said plug 42. The plug 42 is provided with an axially extending opening 45 therethrough which has a counterbore 46 adapted to receive a coil spring 47 and shaped generally to conform to the uppermost end of the core 38. A rod 48 having an annular projection or flange 49 disposed adjacent one end thereof is threaded into the upper end of the core 38 and extends axially of the coil spring 47 through the opening 45 in the plug 42 so that the flange 49 will be disposed thereabove. A permanent magnet 50 formed of some suitable magnetic material such, for example, as the alloy known as "Alnico," is slidably mounted upon the end of the rod 48 opposite that attached to the core 38 being retained thereon by means of the snap ring 51 against which said magnet 50 is urged by the spring 52 seated against the flange 49 on said rod 48.

The core 38 is adapted to be energized by a suitable electrical coil which serves to temporarily magnetize it so as to move it in an axial direction within the tubular member 36 and toward the plug 42. The electrical coil here preferably takes the form of a pair of coils 55 and 56 which are wound upon the exterior of a generally cylindrical member 57 at the opposite ends of which are mounted the disks 58 and 59. The cylindrical member 57 and the disks 58 and 59 are adapted to form a spool which may be slipped over the outer periphery of the tubular member 36 and supported by the upper end of the cover member 19.

The end of the tubular member 36 opposite that secured to the cover member 19 is closed by the end wall 60 and is externally threaded as at 61 terminating in the shoulder 62. The shoulder 62 is adapted to support a shielding disk 63 which is urged thereagainst as by means of a nut 64 and a lock nut 65 both of which are threaded on the external thread 61 on the end of the tubular member 36.

Completely enclosing the pilot valve structure 35 just described is an open ended tubular shell 67 which is disposed concentrically with respect to the core 38 and secured to the cover member 19 as by means of a ring 68 which is adapted to be brazed, welded, soldered or otherwise suitably secured to the shell 67. A plurality of machine screws 69 serve to demountably attach the ring 68 and a suitable gasket 70 to the outermost wall of the cover member 19 in such fashion that the shell 67 will cooperate with the disk 68 to provide a substantially leak-proof seal for preventing any external leakage of fluid from the fluid control unit 10 from entering the interior of the shell 67.

In like manner, the tubular member 36, the disk 58 and the cylindrical member 57 cooperate to minimize the possibility of leakage of the fluid being handled by the fluid control unit 10 from the chamber 31 into the interior of the shell 67. A suitable cap 71 is adapted to be threaded upon the uppermost end of the shell 67 so as to effectively close off the interior of the shell 67 and at the same time to provide access thereto in case it should be necessary or desirable.

An aperture 72 is provided in the shell 67 so as to be located thereon at a point substantially between the shield 63 and the disk 59 therein. An annular member 73 which supports a conduit connection 75 for a suitable electrical conduit is secured to the outer wall of the shell 67 as by means of a plurality of machine screws 74 extending through said conduit connection 75 and said annular member 73 into the wall of the shell 67. The conduit connection 75 is provided with a pair of conductors 76 and 77 of which the former is adapted to be connected to the coils 55 and 56. The conductor 77 is connected with one of a pair of contacts in a manner to be hereinafter described.

A spring arm 79 which is grounded is secured to the upper face of the shield 63. The arm 79 is provided with a contact 80 which is adapted to make contact alternately with the fixed contacts 81 and 82. The fixed contact 81 is supported above the shield 63 adjacent the contact 80 on the arm 79 by means of a bent strip 83 of suitable conducting material such, for example, as copper or the like secured to said shield 63 and connected to a suitable conductor 84. The conductor 84 is connected to an end of each of the coils 55 and 56. The fixed contact 82 is mounted directly on the shield 63 at a point adjacent the contact 80 on the arm 79.

The arm 79 is mounted in such fashion that its contact 80 will be shifted between the fixed contacts 81 and 82 by virtue of its being attracted to the permanent magnet 50 mounted upon the rod 48 threaded into the upper end of the core 38. The spring action of the arm 79 will normally bias the contact 80 thereon against the fixed contact 81. At such time as the core 38 is shifted axially of the tubular member 36 so that it approaches the plug 42, the permanent magnet 50 by virtue of its being mounted upon the rod 48 secured to said core 38 will approach the end wall 60 of the tubular member 36.

In so doing, the permanent magnet 50 will cause the spring arm 79 to be attracted to its thereby making contact between its contact 80 and the fixed contact 82 and at the same time breaking contact with the fixed contact 81. It will be understood that, as the core 38 is shifted and withdraws the permanent magnet from close proximity to the end wall 60 of the tube 36, the attraction of the spring arm 79 for said magnet will be broken and the spring action of the arm will cause the contact 80 to again make contact with the fixed contact 81.

As previously indicated, it is desirable to have the cap 71 threaded upon the end of the shell 67 to enable it to be removed for access to the interior of said shell. It is also desirable to provide a milled or knurled surface for the outermost periphery of the cap 71 for engagement with a spring latching member 85. The spring latching member 85 is secured to the annular member 73 mounted upon the exterior of the shell 67 to engage one of the grooves formed on said cap 71 to prevent unauthorized unscrewing of the cap 71 from the shell 67.

Before discussing the electrical circuits of Figures 3 and 4 of the drawings embodying certain of the elements hereinbefore described, it is preferable to describe another important feature of the fluid control unit 10. As previously indicated, conventional diaphragm type valves will only operate when the pressure of the fluid on the inlet side of the valve exeeceds that on the outlet side. The fluid control unit 10 of the present invention has a compensatory means 88 provided for the purpose of effecting a greater pressure of the fluid on the upper than on the lower side of the diaphragm 22 to hold the valve assembly 24 in closed position with respect to the seat 17 of the outlet passage 16, except when it is intended to be opened by the operation of the pilot valve structure 35.

The flexible diaphragm 22 is imperforate and imprevious to the fluid being handled by the device so that, in order to admit fluid to chamber 31 to cause a pressure differential across the diaphragm, it is necessary to provide communicating passages in the casting 11 both between the chamber 31 in the cover 19 and the internal well 14 as well as between said chamber and the outlet passage 16. Thus, the compensatory means 88 embodies a passage 89 formed in the wall of the casting 11 and opening into the chamber 31 of the cover member 19 through the aid of a passage 90 formed in said cover.

A pair of branch passages 91 and 92 join the passage 89 near the bottom of the casting 11. The branch passage 92 connects directly with a central cavity 93 formed in the recess 94 provided in the base of the casting 11. The branch passage 91 connects directly with a passage 95 formed in the base 96 which is secured to the bottom of the casting 11 as by means of a plurality of machine screws 97. The passage 95 connects directly with a central cavity 98 formed in the bore 99 in the base 96. A suitable passage 100 extends through the bottom wall of the casting 11 and opens into the internal well 14 therein to connect the same with a passage 101 formed in the base 96 and communicating with the bore 99 therein. A passage 102 directly connects the outlet passage 16 with the recess 94 formed in the bottom of the casting 11.

In order to prevent the possibility of leakage between the base 96 and the bottom of the casting 11 to which it is secured, the web portion of a flexible diaphragm 103 serves as a gasket and also separates the recess 94 from the bore 99. As an additional precaution against escape of the fluid being handled by the fluid control unit 10, sleeves 104 and 105 are inserted in suitable counterbores to interconnect passages 91, 95 and 100, 101, respectively. A similar sleeve 106 one end of which is closed except for a small orifice 107 therein is inserted at the joint between the casting 11 and the cover member 19 to interconnect passages 89 and 90, respectively, and to prevent leakage of fluid at the joint.

The flexible diaphragm 103, which may be fabricated from the same material as employed in the manufacture of the diaphragm 22, is centrally apertured to receive the valve member 108 which is secured thereto. The valve member 108 may advantageously be constructed in two parts of substantially annular form and designated as 109 and 110 in Figure 2. The part 109 is provided with a stem portion 111 which projects through the aperture in the diaphragm 103 for carrying the part 110 thereon. The end of the stem portion 111 of the part 109 is peened over the outer face of the part 110 so as to secure the diaphragm 103 between said parts 109 and 110. A spring 112 is adapted to be disposed between the under side of the part 110 and the bottom of the bore 99 in the base 96 to compensate for the weight of the valve member 108 so that the fluid pressure exerted upon the diaphragm 103 need not overcome this weight in order to function.

Encircling the central cavity 93 in the recess 94 there is provided an annular bead 113. This bead 113 is adapted to form a seat for engagement with an annular insert 114 provided in the part 109 of the valve member 108 to insure against the possibility of leakage of fluid therebetween when the valve member 108 is in contact with said bead 113. A similar bead portion 115 encompasses the central cavity 98 in the base of the bore 99 formed in the base 96. As in the case of the bead 113, this bead 115 cooperates with the insert 116 provided in the part 110 of the valve member 108 to provide a suitable closure for said cavity when the valve member 108 is in its lowermost position opposed to that illustrated in Figure 2.

The series of passageways hereinbefore described thus serves in cooperation with the valve member 108 and the diaphragm 103 to alternately interconnect the chamber 31 in the cover member 19 with the internal well 14 in the casting 11 and said chamber 31 with the outlet passage 16 in the casting 11. Thus, when the pressure of the fluid admitted to the internal well 14 in the casting 11 through the inlet bore 12 exceeds the pressure of the fluid in the outlet passage 16, a portion of the fluid in the internal well 14 will enter the passages 100 and 101, the bore 99, passage 95 intercommunicating with the central cavity 98 in the bore 99 by reason of the fact that the valve member 108 is in its uppermost position as indicated in Figures 1 and 2. The fluid disposed in the passage 95 will pass through the sleeve 104 into the branch passage 91 and the passage 89 in the casting 11 into the chamber 31 in the cover member 19 through the passage 90 and the orifice 107 of the sleeve 106 to the upper side of the diaphragm 22.

It will be understood that with the flexible diaphragm 103 and valve 108 of the compensatory means 88 in the position illustrated in Figure 2, the total pressure exerted by the fluid on the upper side of the diaphragm 22 and the valve assembly will exceed that of the fluid on the under side of the diaphragm alone. This continues as long as the valve member 24 is seated against the seat 17 at the upper end of the outlet passage 16 and the fluid pressure in the inlet duct 12 exceeds that in the outlet duct 13.

If, in the course of the operation of the fluid control unit 10, the fluid pressure in the outlet duct 13 and outlet passage 16 should become greater than that of the fluid entering the inlet duct 12 through the internal well 14, communication will be established between the chamber 31 in the cover member 19 and the outlet passage 16. In so doing, the fluid in the outlet passage 16 will flow through the passage 102 into the recess 94 and cause the valve member 108 to be moved to its lowermost position so that the insert 116 therein will contact the bead 115 and close off the central cavity 98 simultaneously opening the central cavity 93 to the fluid in the recess 94. This fluid enters the branch passage 92 and passage 89 in the casting 11 passing into the chamber 31 of the cover member 19 through the sleeve 106 and passage 90 to the upper side of the diaphragm 22.

Thus, as in the instance when the pressure of the fluid in the inlet exceeds the pressure of the fluid in the outlet, the pressure exerted by the fluid upon the upper side of the diaphragm 22 will again be greater than that on the under side thereof even though the fluid pressure differential across the valve is reversed. The fluid retains the flexible diaphragm 22 and the valve member 24 in place against seat 17 until the pressure in the chamber 31 is released as when the pilot valve structure 35 is actuated to open the orifice 27.

The fluid control unit 10 is particularly advantageously employed in a fuel system such, for example, as that employed in an airplane in which a plurality of fuel tanks disposed in various parts of an airplane serve to supply fuel to the engine.

A typical installation of this character is shown diagrammatically in Figure 3 of the drawings in which tanks 120, 121 and 122 represent sources of fuel disposed in various parts of the wings and fuselage of the airplane. Each of the tanks 120 to 122, inclusive, is provided with a respective booster pump 123 to 125, inclusive, for supplying fuel under pressure to the engine 126. A main supply line 127 connected to a carburetor 128 for the engine 126 may be supplied with fuel from the tanks 120 to 122, inclusive, by suitable conduits or tubes 129 to 131, inclusive. One of the fluid control units 10, 10a, 10b, all of which are identical to the fluid control unit 10 of Figures 1 and 2, may be interposed in the tubes 129, 130, and 131, respectively, between the several tanks 120, 121 and 122 and the main supply tube 127 for controlling the flow of fuel from each of the several tanks to the engine 126.

The several switches 132, 132a and 132b, which may be of the simple push-button or toggle-switch type, are adapted to be mounted in some readily accessible position in the airplane such, for example, as on the control panel thereof. The switches 132, 132a and 132b are adapted to control the electrical current from a suitable supply source such, for example, as the battery 133, to each of the several fluid control devices 10, 10a and 10b, respectively, with which they are interconnected as by means of suitable conductors 76, 76a and 76b, together with the auxiliary connections 77, 77a and 77b, respectively.

Thus, if it is desired to supply the engine 126 with fuel from a single tank 120, the switch 132 may be tripped to the "on" position, as indicated in Figure 3. This operation of switch 132 actuates the fluid control unit 10 for opening the tube 129 to the flow of fuel from the tank 120 to the main supply line 127 and thence to the carburetor 128. An electrical circuit is completed by the operation of the switch 132 from the battery 133 through the conductor 76 and the conductor 77 to operate the fluid control device 10 which is connected to a suitable ground.

The electrical circuit for each individual one of the several fluid control devices 10, 10a and 10b, is diagrammatically illustrated in Figure 4 of the drawings in which, upon the closing of the switch 132, battery 133 will supply electrical current to operate one of said devices, in this case, the fluid control unit 10. The electrical circuit from the battery 133 is completed across the switch 132 through the conductor 76 and the coil 55 which serves as a pick-up coil affording relatively low resistance to the passage of the current. This pick-up coil 55 creates an intensified magnetic field to actuate the core 38 which carries the cone-shaped valve member 39 of the fluid control unit 10, as will be seen from Figure 2. This coil 55 exerts a force which is sufficient to disengage the valve member 39 from the seat defined by the washer 41.

The electrical current passing through the pick-up coil 55 is carried by the conductor 84 to the upper fixed contact 81 with which the contact 80 will be closed, by virtue of the fact that the spring arm 79 is in its normal position, to complete the circuit to the ground. The energization of the pick-up coil 55 causes the core 38 to become temporarily magnetized and to move axially of the tubular member 36 against the biasing action of the spring 47. At the same time, the core 38 raises the permanent magnet 50 mounted upon the end of the rod 48 secured to the core 38.

As the permanent magnet 50 approaches the end wall 60 of the tubular member 36, it operates to attract the spring arm 79 toward it and causes the contact 80 thereof to break contact with the upper fixed contact 81 and thereafter to make contact with the lower fixed contact 82. This operation through the holding coil 56 maintains the magnetic field about the core 38. The holding coil 56 is of relatively high resistance as compared with the pick-up coil 55 and retains the core 38 in its retracted position adjacent to the plug 42 for the desired period of operation of supplying fuel from the tank 120 to the engine 126.

Immediately upon the closing of the contact 80 of the spring arm 79 with respect to the lowermost fixed contact 82, a circuit is completed from the battery 133 through the conductors 76 and 77, fixed contact 82, said movable contact 80 and the spring arm 79 which is grounded. Thus, a suitable signalling means such, for example, as the light 134 connected into the conductor 77 will be energized or lighted. A light 134 may be positioned upon the control panel adjacent each of the several switches 132, 132a and 132b corresponding to each of the several fluid control units 10, 10a and 10b, respectively, to indicate when the particular fluid control unit being operated is fully opened.

It will be understood from Figure 2 of the drawings that, when the core 38 is retracted due to the energization of the coils 55 and 56 from the battery 133 in the manner above described, the cone-shaped valve member 39 will be withdrawn from the washer 41 in the upper end of the stem portion 26 thereby opening the passageway 27 extending through the annular member 25. This operation immediately permits the escape of fluid entrapped in the chamber 31 formed in the recess 32 of the cover member 19 through outlet passage 16 and outlet bore 13. This escape of fluid from the chamber 31 immediately creates a pressure differential on the flexible diaphragm 22 as between the chamber 31 and the internal well 14 in the casting 11.

The fluid pressure exerted upon the under side of the flexible diaphragm 22 and the cooperation between the pilot valve 39 and the cap 29 cause the valve member 24 to be raised out of contact with its seat 17 on the uppermost end of the outlet passage 16. Thus, an unobstructed flow of fluid takes place from the inlet bore 12 through the internal well 14 and thence through outlet passage 16 and outlet bore 13.

The fluid control unit 10 of the present invention is particularly advantageous for the reason that is provides a highly satisfactory method of controlling the flow of fluid in a fluid supply system. The operation of the device, as hereinabove described, is such that the energizing of coils 55 and 56 and the consequent lifting of the solenoid core 38 will assist the fluid pressure differential created by the opening of the passage 27 in the diaphragm 22 and will cause the valve member 24 to be raised away from the seat 17. This actuation of the valve member 24 provides an unobstructed flow of the fluid from the well 14 through the outlet passage 16 so that no appreciable drop in the pressure exerted on the fluid by the booster pump 123 adjacent the fuel tank 120 will be experienced.

The feature is of considerable importance for the reason that it effectively eliminates mechanical vaporization of the fluid in the valve due to the building up of pressure therein and thereby prevents the possibility of the occurrence of vapor lock. By reason of the provision of the compensatory means 88 in the fluid control unit 10 of the present invention, there will be no possibility of the occurrence of a false operation of the unit. In other words, the device will not operate to permit fluid to flow from the outlet to the inlet in the event of a pressure differential occurring therebetween. It has been found that a pressure change as slight as 0.7 lb. per square inch between the inlet and outlet connection will cause the compensatory means 88 to operate.

The use of a suitable signalling means such as the light 134 serves as a highly efficient method of determining at all times the state of operation of the fluid control unit 10 or its associated devices employed in the system. By virtue of the electrical circuit of Figure 4 associated with the fluid control unit 10, it will be understood that a fixed relationship exists at all times between the valve operating mechanism of the fluid control unit and signalling means. Thus, the light 134 will go out when the valve is closed or when the solenoid is deenergized in the event that the electrical circuit becomes defective for any reason.

It will, of course, be understood that various details of construction may be varied through a wide range without departing from the principles of this invention and it is, therefore, not the purpose to limit the patent granted hereon otherwise than necessitated by the scope of the appended claims.

I claim as follows:

1. A fluid control device for handling fluid under pressure comprising a casing, an inlet connection and an outlet connection in the casing, a port between said inlet and outlet connections, a flexible diaphragm in the casing movable toward and away from said port for opening and closing the outlet connection, a chamber in said casing on the opposite side of the diaphragm from the inlet and outlet connections, said diaphragm being responsive to pressure within said chamber tending to seat said diaphragm on said port, and fluid actuated means communicating with both the inlet and the outlet connections and responsive to the pressure differential between said connections for admitting a portion of the fluid under pressure to said chamber from that one of said connections in which the fluid pressure is the greater and preventing undesired opening of said diaphragm when the outlet pressure exceeds the inlet pressure.

2. In a fuel system, a plurality of fuel tanks, an engine employing fuel from said tanks, piping interconnecting the tanks and the engine, a booster pump in the discharge line of each tank for applying pressure to the fuel in the system, and shut-off means disposed between said pump and said engine for each tank, each of said shut-off means comprising a casing having an inlet and an outlet connected to said piping, first valve means embodying a flexible diaphragm responsive to the pressure on the fuel for controlling the flow of fuel through the casing, second valve means embodying a flexible diaphragm for preventing false operation of the first valve means and a reverse flow of fuel through the casing from the outlet toward the inlet, pilot valve means for opening the first valve means to direct fuel from the inlet to the outlet of the shut-off unit, and signalling means coacting with said pilot valve means for indicating when the first valve means is fully open.

3. A fluid control device comprising a casing having an inlet and an outlet connection for respectively introducing fluid under pressure to and withdrawing fluid from the casing, a flexible diaphragm movable into engagement with and disengagement from said outlet connection for opening and closing said outlet connection, a chamber in said casing on the opposite side of said diaphragm from the inlet and outlet connections, said diaphragm being responsive to pressure within said chamber tending to engage said diaphragm with said outlet connection, fluid actuated valve means for alternately providing communication between the inlet connection and the chamber and between the outlet connection and the chamber and including passageways from said inlet and outlet connections to opposite sides of said valve means and other passageways from opposite sides of said valve means to said chamber, said fluid actuated valve means being responsive to the differential in pressure in said inlet and outlet connections and movable thereby to establish communication between said chamber and the connection having the greater pressure, said diaphragm having a passageway therethrough and valve means closing said passageway and operable to open said passageway and relieve the fluid pressure on the side of the diaphragm adjacent the chamber and move the diaphragm into position to open the outlet connection by the inlet pressure against said diaphragm.

4. A pilot controlled fluid actuated diaphragm valve comprising an inlet chamber and an outlet chamber, a valve between said chambers including a valve seat defining a port and a diaphragm movable by fluid pressure to close said port, said inlet chamber and said outlet chamber being on the same side of said diaphragm as said seat, a third chamber on the opposite side of said diaphragm, said diaphragm being responsive to pressure within said chamber tending to seat said diaphragm on said port, said diaphragm having an opening communicating said third chamber with said outlet chamber, a pilot valve associated with said opening to open and close the same, and means including a first passage connected to the inlet chamber, a second passage connected to said outlet chamber, a third passage communicating with said third chamber, a reservoir connected to each of said passages, a diaphragm pressure actuated valve closing said third passage to the flow of fluid from said first or second passage and controlling flow to said third passage and movable in response to the pressure differential in said first and second passages to open said third passage to whichever of said first and second passage has the greater pressure therein.

5. A fluid control device comprising a casing having inlet and outlet chambers with a connecting port therebetween, a flexible diaphragm, a valve on said diaphragm associated with said port for opening and closing the same, said diaphragm being subjected on one side to inlet pressure tending to close said valve and on the other side to inlet pressure over a portion of said diaphragm and outlet pressure on another portion thereof tending to open said valve, said valve having a bleeder passage extending therethrough, a pilot valve movable into engagement with said bleeder passage for closing the same and movable away from said passage to establish communication between said one side and said outlet to effect a decrease in pressure on said one side of said diaphragm permitting inlet pressure on the other side of said diaphragm to move said valve to opening position, cap means surrounding the pilot valve and secured to the valve on the diaphragm, a solenoid having an armature connected with said pilot valve, said solenoid being energizable to actuate the pilot valve to open the bleeder passage and to contact the cap means to assist the pressure differential across the diaphragm to raise the valve on the diaphragm to fully open position with respect to the outlet connection.

6. A fluid controlled device comprising a casing a casing having an inlet and an outlet connection with a connecting port, a chamber disposed in said casing, a diaphragm valve disposed over said port between said chamber and said connections for closing said port and having a portion subject to pressure in the inlet connection and having an aperture therethrough between said chamber and said outlet connection, a first conduit connecting said inlet to said chamber for equalizing the pressure on both sides of said diaphragm, a pilot valve associated with said aperture and movable away therefrom for releasing the pressure in said chamber to the outlet connection allowing fluid under pressure in said inlet connection to act on said portion of said diaphragm valve to lift the same off said port to permit unrestricted flow from said inlet to said outlet, a second conduit from said outlet to said chamber and pressure sensitive valve means connected with said first and second conduits and operative on the differential in pressure between both said first and second conduits, and being effective in one position for connecting said outlet to said chamber when the pressure in said outlet connection exceeds the pressure in said inlet connection, whereby the pressure in said chamber will be equalized with that in said outlet connection and whereby no flow from said chamber to said outlet connection will result when said pilot valve is actuated.

7. A fluid control device comprising a casing, a flexible diaphragm in said casing dividing the interior thereof into a first and second chamber, said first chamber having an inlet and an outlet for respectively introducing fluid under pressure to and withdrawing it from said first chamber, a port between said inlet and outlet closed by pressure in said second chamber exerted against said diaphragm, said casing having a first passage interconnecting the inlet with the second chamber and a second passage connecting the outlet with the second chamber, and fluid actuated valve means connected with said passages and operable responsive to pressure differentials in said inlet and outlet passage and movable when the outlet pressure is greater than the inlet pressure to open said second passage to supply fluid under pressure to said second chamber.

8. A fluid control device for handling fluid under pressure comprising a casing, an inlet and an outlet connection in the casing, a port between said inlet and outlet cnnection, a flexible diaphragm in the casing movable toward and away from said port for opening and closing the outlet connection, a chamber in said casing on the opposite side of said diaphragm from the inlet and outlet connection, and fluid pressure in said chamber moving said diaphragm into position to close said port, said casing having a first passage interconnecting the inlet connection with the chamber and a second passage connecting the outlet connection with the chamber, and fluid actuated valve means connected with said first and second passages and responsive to pressure differential in the inlet and outlet connections and movable when the outlet pressure is greater than the inlet pressure to open said scond passage to supply fluid under pressure to said chamber.

9. A fluid control device for handling fluid under pressure comprising a casing having an inlet and an outlet therein, a port between said inlet and outlet, a flexible diaphragm in the casing movable into engagement with said port for controlling the flow of fluid through said outlet, said inlet and said outlet being disposed on the same side of the diaphragm, a chamber on the opposite side of the diaphragm from said inlet and outlet and pressure within said chamber moving said diaphragm into engagement with said port, said casing having passages therein connecting said inlet and outlet connections with said chamber, and fluid actuated valve means connected with said passages and responsive to pressure differential between said inlet and outlet passage and movable by the pressure in the outlet passage when the outlet pressure is greater than the inlet pressure to supply pressure to said chamber through said outlet connection.

10. A fluid control device comprising a casing having inlet and outlet connections for the passage of fluid under pressure therethrough, a port connecting said inlet and outlet connections, a flexible diaphragm engageable with said port to close the same, and fluid operated valve means responsive to the differential pressures between said inlet and outlet connections and including a pressure line to the side of said diaphragm remote from said port, and said valve being connected with said inlet and outlet connections and operative whenever the fluid pressure in the outlet connection exceeds that in the inlet connection, to open said pressure line for the admission of fluid under outlet pressure to said remote side of said diaphragm to urge said diaphragm toward its closed position.

11. A fluid control device comprising a casing having inlet and outlet connections for the passage of fluid under pressure therethrough, a port connecting said inlet and outlet connections, a flexible diaphragm engageable with said port to close the same, fluid operating means sensitive to pressure differential in said inlet and outlet connections and operated whenever the fluid pressure in the outlet exceeds that in the inlet connections to supply pressure to the side of said diaphragm opposite from said port and urge the diaphragm toward its closed position, a pressure relief opening in said diaphragm and a pilot valve connected to open or close said opening and control movement of said diaphragm toward and from said port by the differential in pressure thereon.

12. A pilot controlled fluid actuated diaphragm valve comprising an inlet chamber adapted to receive fluid under pressure, an outlet chamber, a pressure operated valve member between said chambers including a port and a diaphragm having an aperture therethrough, said diaphragm being otherwise imperforate and moved to open and closed positions by the differential in pressure on opposite sides thereof, a pilot valve disposed to open and close said aperture and control the fluid pressure to which said diaphragm is subjected, solenoid operated means for actuating the pilot valve to open said aperture and create a pressure differential across the diaphragm in a direction to open said port between said chambers, means on said diaphragm engageable by said pilot valve to shift said valve member to fully opened position upon operation of the solenoid operated means, and means for rendering the pilot inoperative to control said diaphragm when the fluid pressure in the outlet chamber exceeds the fluid pressure in the inlet chamber.

13. In a fuel system, a plurality of fuel tanks, an engine employing fuel from the tanks, piping interconnecting the tanks and the engine, a booster pump in the discharge line of each tank for applying pressure to the fuel in the system, and shut-off means disposed between said pump and said engine for each tank, each of said shut-off means comprising a casing having an inlet and an outlet connected to said piping, first valve means employing a flexible diaphragm responsive to the pressure on the fuel for controlling the flow of fuel from the casing, a second valve means embodying a flexible diaphragm for preventing false operation of the first valve means and a reverse flow of fuel from the casing from the outlet toward the inlet, and pilot valve means for opening the first valve means to direct the fuel from the inlet to the outlet of the valve unit.

14. A fluid control device comprising a hollow casing defining a chamber and having inlet and outlet connections opening into said chamber, a diaphragm disposed in said casing between said inlet and outlet connections and said chamber and operated by pressure in said chamber to block the passage of fluid from said inlet to said outlet connections, and having an aperture therethrough connecting said outlet to said chamber, a valve member secured to said diaphragm and movable into closing position into engagement with the end of said outlet connection upon actuation of said diaphragm by the differential in pressure thereon, a pilot valve movable toward and away from said aperture to control flow of fluid therethrough, means for actuating said pilot valve, a by-pass line connecting said chamber to said inlet and outlet connections, valve means disposed in said by-pass line and arranged to connect said chamber to that one of said connections in which the fluid pressure is greater, whereby if said outlet pressure is greater, actuation of said pilot valve will not effect the position of said diaphragm and when said inlet pressure is greater, the pressure in said chamber will be decreased permitting lifting of said diaphragm and said diaphragm valve away from the end of said outlet connection.

HAROLD B. DRAPEAU.

REFERENCES CITED

The following references are of record in the file of this patent:

UNITED STATES PATENTS

| Number | Name | Date |
|---|---|---|
| 570,727 | Gale | Nov. 3, 1896 |
| 620,829 | Batchelor | Mar. 7, 1899 |
| 1,157,870 | Houser | Oct. 26, 1915 |
| 1,367,460 | Caudron | Feb. 1, 1921 |
| 1,407,374 | Buckendale | Feb. 21, 1922 |
| 1,776,877 | Yonkese | Sept. 30, 1930 |
| 1,800,352 | Klees | Apr. 14, 1931 |
| 1,953,671 | Conran | Apr. 3, 1934 |
| 1,989,341 | Shenton | Jan. 29, 1935 |
| 2,086,037 | Kronmiller | July 6, 1937 |
| 2,135,243 | Swain | Nov. 1, 1938 |
| 2,176,580 | Buttner | Oct. 17, 1939 |
| 2,234,110 | Debrey | Mar. 4, 1941 |
| 2,273,127 | McGoldrick | Feb. 17, 1942 |
| 2,292,477 | Ray | Aug. 11, 1942 |
| 2,294,693 | Ray | Sept. 1, 1942 |
| 2,303,382 | Newhouse | Dec. 1, 1942 |
| 2,305,151 | Fields | Dec. 15, 1942 |
| 2,349,209 | Taylor | May 16, 1944 |
| 2,362,631 | Harris | Nov. 14, 1944 |
| 2,378,404 | Grant | June 19, 1945 |
| 2,388,868 | Ray | Nov. 13, 1945 |
| 2,409,871 | Krough | Oct. 22, 1946 |

FOREIGN PATENTS

| Number | Country | Date |
|---|---|---|
| 102,732 | Great Britain | Oct. 4, 1917 |